US010738511B2

(12) United States Patent
Nakasone

(10) Patent No.: US 10,738,511 B2
(45) Date of Patent: Aug. 11, 2020

(54) LOCKING DEVICE FOR OPENING/CLOSING BODY

(71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 182 days.

(21) Appl. No.: 15/779,378

(22) PCT Filed: Nov. 21, 2016

(86) PCT No.: PCT/JP2016/084375
§ 371 (c)(1),
(2) Date: May 25, 2018

(87) PCT Pub. No.: WO2017/090545
PCT Pub. Date: Jun. 1, 2017

(65) Prior Publication Data
US 2018/0347241 A1    Dec. 6, 2018

(30) Foreign Application Priority Data

Nov. 27, 2015  (JP) .................................. 2015-231815

(51) Int. Cl.
*E05B 83/00* (2014.01)
*E05B 83/30* (2014.01)
(Continued)

(52) U.S. Cl.
CPC ................ *E05B 83/30* (2013.01); *B60R 7/06* (2013.01); *E05C 3/30* (2013.01); *E05C 9/04* (2013.01); *E05C 21/00* (2013.01)

(58) Field of Classification Search
CPC .......... E05B 83/00; E05B 83/30; E05B 85/06; E05B 1/04; E05B 9/04; E05B 13/10;
(Continued)

(56) References Cited

U.S. PATENT DOCUMENTS 9,074,389 B2 *   7/2015  Shimizu ..................... E05D 1/04
9,850,691 B2 *  12/2017  Nakasone ............... E05B 83/30
(Continued)

FOREIGN PATENT DOCUMENTS

CN      1944930 A      4/2007
CN    102171407 A      8/2011
(Continued)

OTHER PUBLICATIONS

International Search Report (ISR) (PCT Form PCT/ISA/210), in PCT/JP2016/084375, dated Feb. 7, 2017, and English Translation.
(Continued)

*Primary Examiner* — Suzanne L Barrett
(74) *Attorney, Agent, or Firm* — McGinn I.P. Law Group, PLLC.

(57) ABSTRACT

There is provided a lock device for an opening/closing body that is attached to an opening portion of a fixed body so as to be openable and closable. The lock device includes lock portions, a pair of rods, a manipulation unit, and a link unit. The opening/closing body or the fixed body has an installation surface on which the link unit is installed, and the installation surface is provided with a holding portion which holds the link unit. One of the base portion and the holding portion is formed with a bendable elastic engagement piece or pieces, and the base portion is installed on the installation surface as a result of the elastic engagement piece or pieces being engaged with the other of the base portion and the holding portion.

7 Claims, 18 Drawing Sheets

(51) Int. Cl.
  *E05C 21/00* (2006.01)
  *E05C 9/04* (2006.01)
  *B60R 7/06* (2006.01)
  *E05C 3/30* (2006.01)

(58) Field of Classification Search
  CPC .......... E05B 85/14; E05B 15/00; E05B 83/28; B60R 7/06; E05C 9/006; E05C 9/047; E05C 9/043; E05C 9/04; E05C 9/00
  USPC ................. 70/162, 368, 370, 371, 386, 389, 70/453–455
  See application file for complete search history.

(56) References Cited

U.S. PATENT DOCUMENTS

| | | | |
|---|---|---|---|
| 10,435,921 B2 * | 10/2019 | Nakasone | E05C 9/043 |
| 10,480,223 B2 * | 11/2019 | Nakasone | E05C 9/042 |
| 2007/0080542 A1 | 4/2007 | Ookawara | |
| 2011/0174027 A1 | 7/2011 | Ookawara et al. | |
| 2011/0309640 A1 * | 12/2011 | Matsubara | E05B 63/248 |
| | | | 292/159 |
| 2015/0028602 A1 | 1/2015 | Shimizu et al. | |
| 2015/0152671 A1 | 6/2015 | Nakasone | |
| 2017/0044803 A1 | 2/2017 | Nakasone | |
| 2019/0040663 A1 * | 2/2019 | Ruzich | E05C 9/04 |
| 2019/0048626 A1 | 2/2019 | Shimizu et al. | |

FOREIGN PATENT DOCUMENTS

| | | |
|---|---|---|
| CN | 104145071 A | 11/2014 |
| JP | 2005-104192 A | 4/2005 |
| KR | 10-0710442 B1 | 4/2007 |
| WO | WO 2013/187388 A1 | 12/2013 |
| WO | WO 2015/163282 A1 | 10/2015 |

OTHER PUBLICATIONS

International Search Report (ISR) (PCT Form PCT/ISA/237), in PCT/JP2016/084375, dated Feb. 7, 2017.
Chinese Office Action, dated Jul. 25, 2019, in Chinese Application No. 201680069080.3 and English Translation thereof.
English Translation of International Preliminary Report on Patentability (IPRP) (PCT Form PCT/IPEA/409), in PCT/JP2016/084375, dated Mar. 28, 2018.

\* cited by examiner

LOCKING DEVICE FOR OPENING/CLOSING BODY

TECHNICAL FIELD

The present invention relates to an opening/closing body lock device for locking, in a closed state, an opening/closing body that is attached to an opening portion of a fixed body so as to the openable and closable.

BACKGROUND ART

For example, an opening/closing body such as a lid is attached to an opening portion feat is formed in a fixed body such as a glove compartment of an automobile, so as to be openable and closable. And a lock device that is locked when the opening/closing body is closed and can be unlocked in opening the opening/closing body is provided between the opening portion and the opening/closing body.

For example, the following Patent document 1 discloses, as such a lock device, an open/close lock device for a glove compartment which is equipped wife a pair of lock portions which are provided in the opening portion of the glove box at left and right positions, a pair of rods which are installed on a lid and each of which is formed with rack grooves on the side of its base end, a manipulation unit which is disposed in the instrument panel near the driver's seat and equipped with a push-type knob, a support plate which supports, rotatably, a gear that is meshed with the sets of rack grooves of the pair of rods and slides the rods in a synchronized manner, and a spring which urges ones of the rods toward the associated lock portion. In this lock device, the manipulation unit for manipulating the rods is separate from the gear for sliding the rods and a support plate that supports the gear is fixed to the lid using plural screws, small screws, or the like.

PRIOR ART DOCUMENTS

Patent Document

Patent Document 1: Japanese Patent Application Publication No. 2005-104192A

SUMMARY OF INVENTION

Problems to be Solved by Invention

However, in the above lock device for a glove compartment, since the support plate which supports, rotatably, the gear that is meshed with the sets of rack grooves of the pair of rods is attached to the lid by screwing the former on the latter using plural screws, small screws, or the like, the attaching work is complicated and cumbersome.

An object of the invention is therefore to provide an opening/closing body lock device in which a link unit having a rotary member to which rods are to be coupled can be attached to an installation surface of a fixed body or an opening/closing body easily.

Means for Solving Problems

To attain, the above object, the invention provides a lock device for ax opening/closing body that is attached to an opening portion of a fixed body so as to be openable and closable, the lock device comprising lock portions provided on one of the opening portion of the fixed body and the opening/closing body; a pair of rods which axe provided on the other of the fixed body and the opening/closing body and are to engage with or disengage from the respective lock portions; a manipulation unit to manipulate the rods to engage or disengage the rods with or from the respective lock portions; and a link unit which is separate from the manipulation unit and has a base portion and a rotary member that is supported rotatably by the base portion via a support portion and is coupled with the pair of rods, wherein the opening/closing body or the fixed body has an installation surface on which the link unit is installed, and the installation surface is provided with a holding portion which holds the link unit; and wherein one of the base portion and the holding portion is formed with a bendable elastic engagement piece or pieces, and the base portion is installed on the installation surface as a result of the elastic engagement piece or pieces being engaged with the other of the base portion and the holding portion.

In the lock device for the opening/closing body according to the invention, it is preferable that the holding portion of the opening/closing body or the fixed body have a pair of support walls; that the base portion have a pair of support pieces which are disposed inside the pair of support walls; and that the pair of support walls and the pair of support pieces be provided with coming-off-preventive portions which prevent the base portion from coming off the installation surface in a direction perpendicular to the installation surface.

In the lock device for the opening/closing body according to the invention, it is preferable that the base portion have a bottom surface on which the rods are mounted; and that coming-off-preventive portions having respective restriction surfaces that prevent the base portion from coming off the installation surface in a direction perpendicular to the installation surface be located at a position that is above or at the same level, as the bottom surface of the base portion and below or at the same level as ceiling surfaces of the respective rods.

In the lock device for the opening/closing body according to Invention, it is preferable that the pair of support pieces of the base portion be formed so as to guide the pair of rods when they slide as the rotary member rotates.

In the lock device for the opening/closing body according to invention, it is preferable that the support walls be formed with respective recesses or holes; and that the elastic engagement pieces be formed in the respective support pieces, engaged with the respective recesses or holes, and formed so as to be bending-restricted by the rods being disposed between the pair of support pieces.

In the lock device for the opening/closing body according to the invention, it is preferable that the holding portion of the opening/closing body or the fixed body have a receiving portion which receives the base portion from a direction that crosses the direction perpendicular to the installation surface; and that the bendable elastic engagement piece be formed in the base portion on the side of a bottom surface thereof in such a manner as to engage with an inside portion of the receiving portion of the holding portion and thereby prevent the base portion from coming off the receiving portion when the base portion is inserted into the receiving portion.

Advantageous Effects of Invention

In the invention, the link unit which is separate from the manipulation unit can be attached to the installation surface of the opening/closing body by easy work of merely putting the link unit on the installation surface and engaging the elastic engagement piece or pieces provided in one of the base portion and the holding portion with the other of the base portion and the holding portion. This work of attaching the link unit is easier than, for example, attachment work using small screws. Furthermore, since the link unit is provided separately from the manipulation unit, the degree of freedom of layout can be increased and the installation space of the lock device can be made thinner.

EMBODIMENTS OF INVENTION

An opening/closing body lock device according to a first embodiment of the present invention will be hereinafter described with reference to the FIGS. 1-8.

Figure 2:
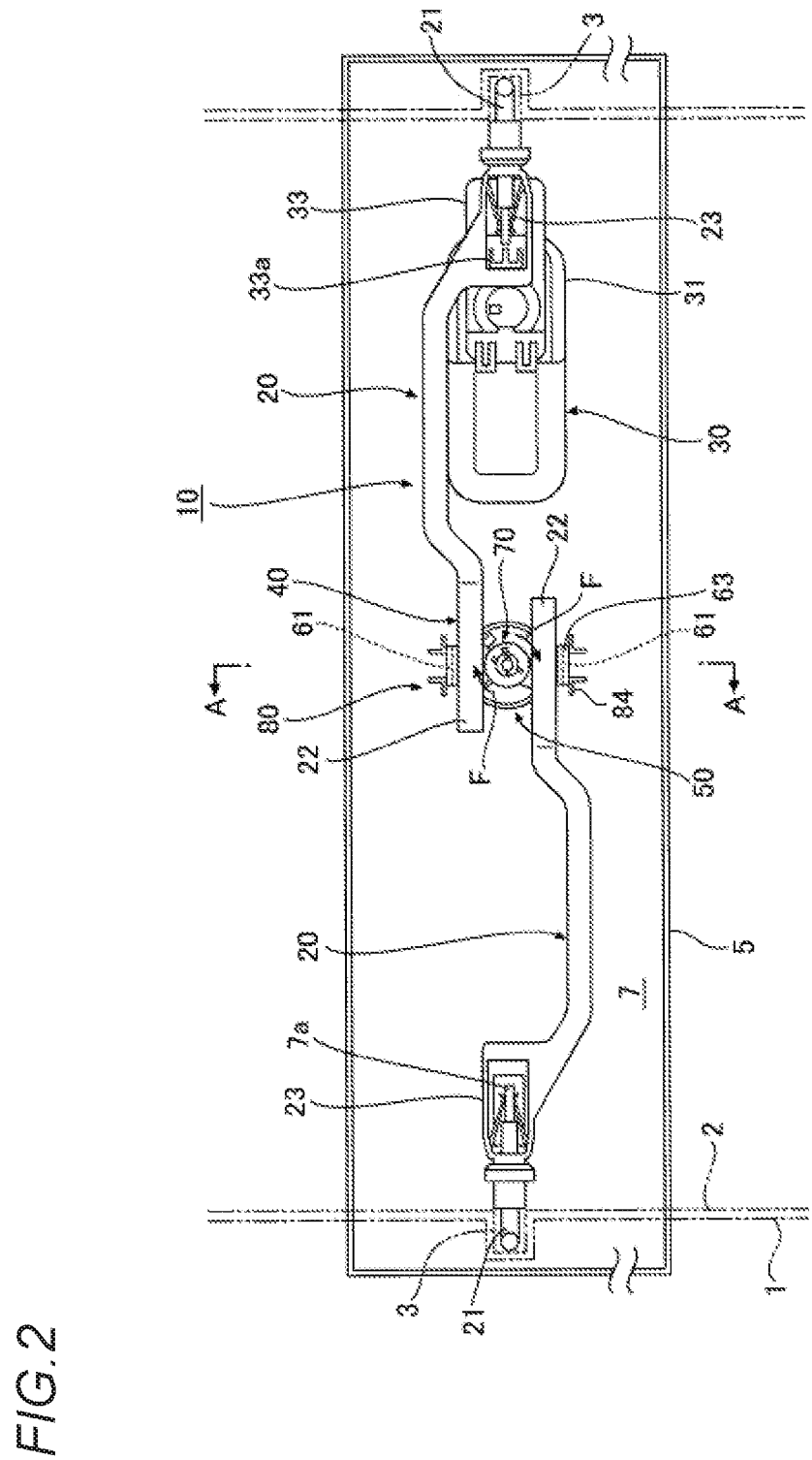
FIG. 2 is an explanatory diagram of the same lock device.

As shown in FIG. 2, an opening/closing body lock device 10 (hereinafter referred to as a "lock device 10") according to the embodiment is used for, for example, open/close-locking an opening/closing body 5 that is attached, so as to be openable and closable, to an opening portion 2 of a fixed body 1, such as a glove compartment provided in a vehicle instrument panel.

The opening/closing body lock device can be used broadly for various open/close bodies for opening and closing an opening portion of a fixed body. For example, the opening/closing body lock device can be applied to a structure in which a box-shaped glove compartment is attached to an opening portion of an instrument panel in a swingable manner (in this case, the instrument panel is a "fixed body" and the glove compartment is an "opening/closing body") and a structure in which a lid is attached to an opening portion of an instrument panel in an openable and closable manner (in this case, the instrument panel is a "fixed body" and the lid is an "opening/closing body").

As shown in FIG. 2, in this embodiment, inner surfaces of the opening 2 of the fixed body 1 is provided with two respective recess-shaped lock portions 3. The shape of each lock portion is not limited to a recess shape and may be any of a hole shape, a projection shape, a frame shape, etc. And the lock portions may be provided for the opening/closing body instead of the fixed body. The lock portions are not restricted these respects.

Figure 1:
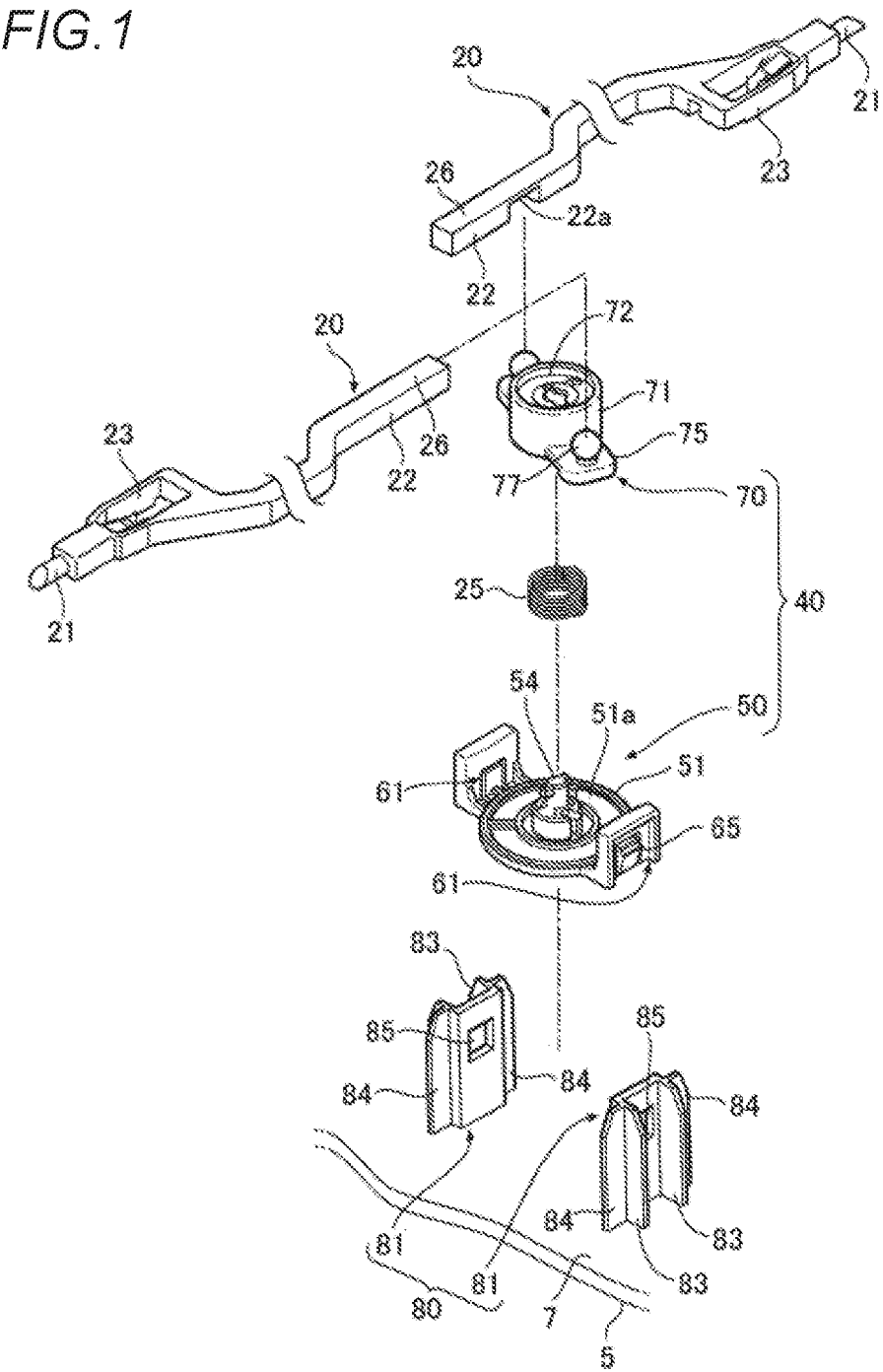
FIG. 1 is an exploded perspective view of an opening/closing body lock device according to a first embodiment of the present invention.

As shown in FIGS. 1 and 2, the lock device 10 according to the embodiment is provided for the opening/closing body 5 and has a pair of rods 20 to be engaged with or disengaged from the respective lock portions 3, a manipulation unit 30 for manipulating the rods 20 to cause them to be engaged with or disengaged from the respective lock portions 30, and a link unit 40. The link unit 40, which is separate from the manipulation unit 30, has a base portion 50 and a rotary member 70 which is attached to the base portion 50 rotatably via a support portion and with which the pair of rods 20 are coupled. The link unit 40 also has an urging spring 25 which is a torsion spring and serves to urge the rotary member 70 rotationally and thereby urges the rods 20 toward the respective lock portions 3.

As shown in FIGS. 1 and 2, the opening/closing body 5 employed in the embodiment is shaped like a plate that is long in the horizontal direction and has an installation surface 7 on which the link unit 40 is installed. The installation surface 7 is provided with a holding portion 80 which holds the link unit 40 on the installation surface 7.

Figure 5:
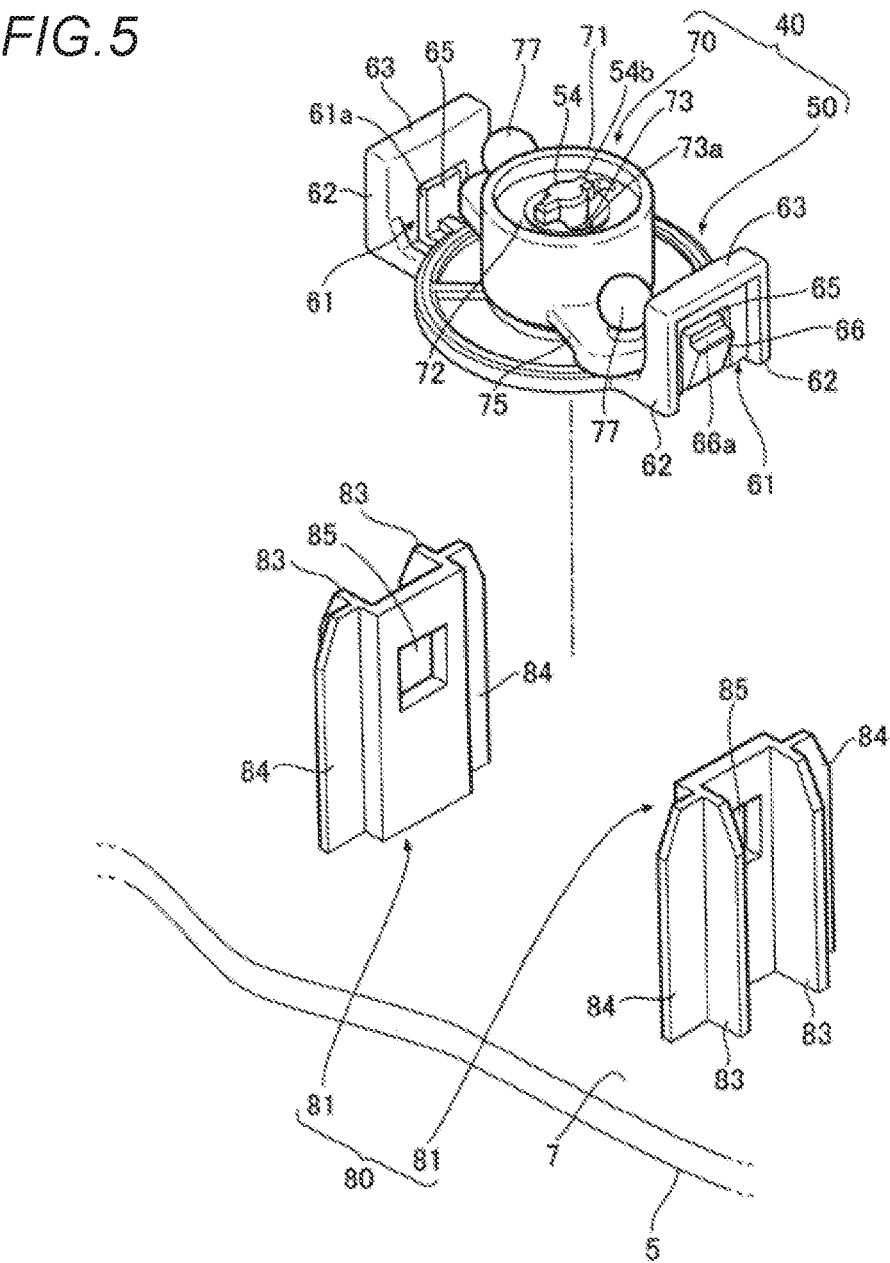
FIG. 5 is a perspective view showing how rods are attached to an installation surface in the same lock device.

Also referring to FIG. 5, the holding portion 80 employed in the embodiment has a pair of support walls 81 which are opposed to each other. Each support wall 81 is erected from the installation surface 7 by a prescribed length and is approximately shaped like a long and narrow plate. Each support wall 81 has two side walls 83 which are connected to the two respective sides, in its width direction, of the support wall 81 so as to extend perpendicularly to the support wall 31. Each support wall 81 also has extension walls 84 which extend outward from the outside surfaces of the side walls 83 at prescribed positions, respectively. In the holding portion 80, the pair of support walls 81 are arranged so as to be parallel with each other and the side walls 83 of each support wall 81 are arranged so as to extend in such directions as to go away from each other. A rectangular hole 85 is formed in each support wall 81 at a position near its top.

Figure 6:
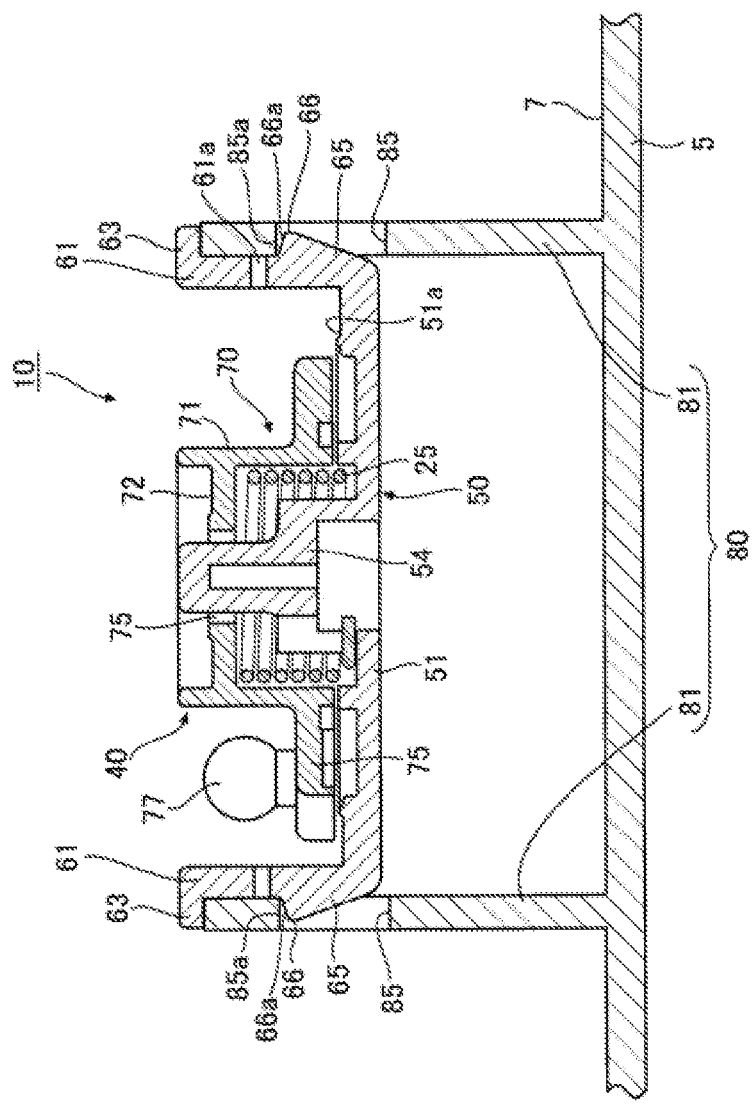
FIG. 6 is a sectional view, taken along arrowed line A-A in FIG. 2, of the same lock device in which the rods are not attached to a rotary member.

As shown in FIG. 6, elastic engagement pieces 65 (described later) of the base portion 50 of the link unit 40 are engaged with the holes 85 of the pair of support walls 81, respectively, whereby the link unit 40 is installed on the installation surface 7.

There are no particular limitations on the shape and structure of the support walls that constitute the holding portion as long as they are shaped so as to be able to hold the link unit. The hole 85 is formed through each support wall 81 employed in the embodiment at the position near its top, and the link, unit 40 is installed at a position near the tops of the support walls 81 with a prescribed gap formed between the link unit 40 and the installation surface 7 of the opening/closing body 5. However, naturally, the base portion 50 of the link unit 40 may be installed so as to be in contact with the installation surface 7 by forming short support walls 81. Each support wall may be formed with, instead of the hole, a recess which does not penetrate through it; it suffices that the elastic engagement pieces be able to be engaged with the respective support walls.

Although in the embodiment the opening/closing body-5-side installation surface 7 is an installation surface on which the link unit 40 is installed, a fixed-body-1-side installation surface may be used as an installation surface on which the link unit 40 is installed.

As shown in FIGS. 1 and 2, each of the rods 20 which have the same shape is bent like a crank at a halfway position in its axial direction. And a tip portion 21 of each rod 20 is to be engaged with or disengaged from, the associated lock portion 3. A base portion 22 of each rod 20 is formed with a link recess 22a. Rod link portions 77 (described later) of the rotary member 70 are coupled with the respective link recesses 22a, whereby the pair of rods 20 are coupled with the rotary member 70.

Each rod 20 is formed with a frame-like portion 23 at a position close to its tip portion 21. As shown in FIG. 2, a guide projection 7a which projects from the installation surface 7 of the opening/closing body 5 is inserted in one frame-like portion 23 and thereby guides the associated rod 20 when it slides. A manipulation piece 33a (see FIGS. 2 and 3) of the manipulation unit 30 is inserted in the other frame-like portion 23 to slide-manipulate the associated rod 20. The rods 20 are disposed above a bottom surface 51a of the base portion 50 (see FIG. 7), and the surfaces, opposite to the bottom surface 51a, of the rods 20 are ceiling surfaces 26, respectively.

There are no particular limitations on the shape, structure, etc. of each rod. Although in the embodiment the rods 20 are provided on the opening/closing body side, they may be provided on the feed body side.

Next, the manipulation unit 30 will be described.

Figure 3:
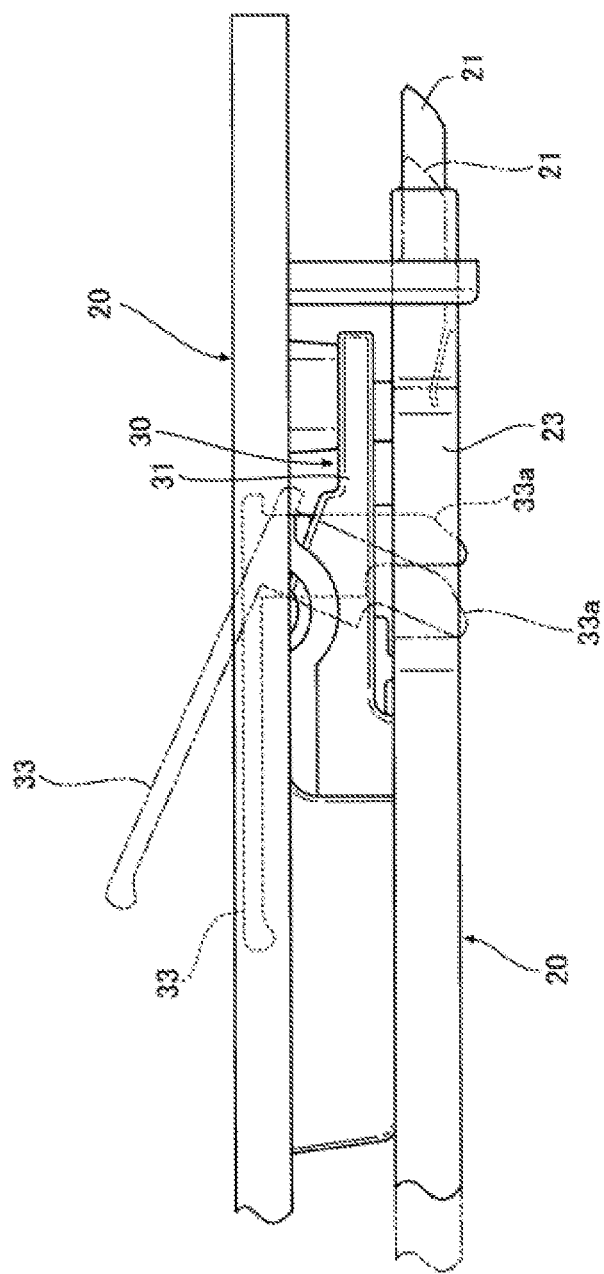
FIG. 3 is an explanatory diagram of a manipulation unit of the same lock device.

As shown in FIGS. 2 and 3, the manipulation unit 30, which is provided separately from the link unit 40, is, in the embodiment, composed of a fixed body 31 which is fixed to the opening/closing body 5 and a manipulation knob 33 which is attached to the fixed body 31 so as to be able to come closer to and go away from the surface of the opening/closing body 5. The manipulation knob 33 is provided with the manipulation piece 33a, which goes into the frame-like portion 23 of the other rod 20 to slide-manipulate the rod 20 (sec FIGS. 2 and 3).

For example, the manipulation unit 30 may be a rotary knob or a rotary handle that rotates parallel with the surface of the opening/closing body or the fixed body or a push-type member that is pushed perpendicularly to the surface of the opening/closing body or the fixed body. There are no particular limitations on the structure of the manipulation unit 30 as long as it allows the rods 20 to be engaged with and disengaged from the respective lock portions 3. The manipulation unit 30 may be attached to the fixed body side.

Next, the link unit 40 will be described.

First, the base portion 50 will be described with reference to FIG. 4. The base portion 50 is formed with bendable, elastic engagement pieces 65. The base portion 50 is installed on the installation surface 7 as a result of engagement of the elastic engagement pieces 65 with the holding portion 80 provided on the installation surface 7 (see FIG. 6).

Figure 4:
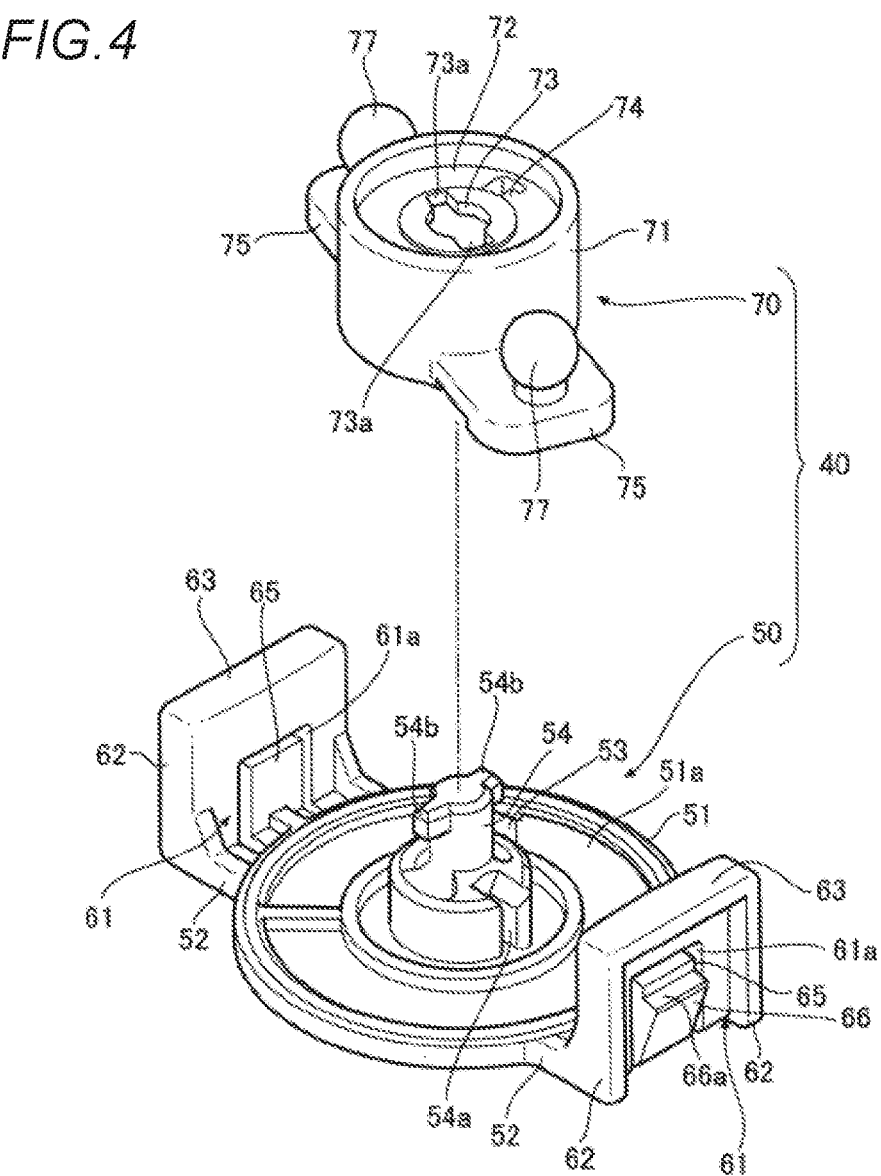
FIG. 4 is an exploded perspective view of a link unit of the same lock device.

As shown in FIG. 4, the base portion 50 employed in the embodiment has a bottom portion 51 which is generally shaped like a circular disc. One surface of the bottom portion 51 is the bottom surface 51a on which the above-described pair of rods 20 are mounted.

A shaft portion 54 for supporting the rotary member 70 rotatably projects from the center of the bottom surface 51a of the bottom portion 51. A base portion of the shaft portion 54 is wider than its tip portion, and the outer circumferential surface of its base portion is formed with a spring lock groove 54a in which one end of the urging spring 25 is inserted and locked. A pair of projections 54b project from the outer circumferential surface of the tip portion of the shaft portion 54 and serve to hold the rotary member 70 so that it does not come off the base portion 50.

Figure 15:
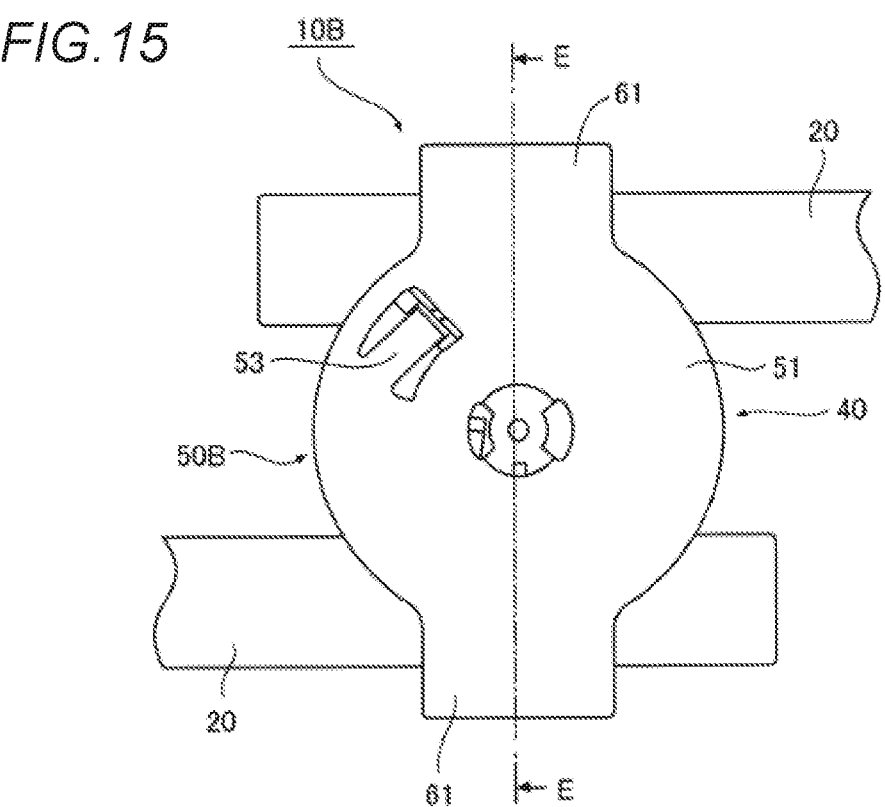
FIG. 15 is an enlarged explanatory diagram of an essential part of an opening/closing body lock device according to a third embodiment of the invention.

Furthermore, as shown in FIG. 4 and FIG. 15 for description of an embodiment to be described later, the bottom portion 51 is formed with, at a prescribed position outside the shaft portion 54, a bendable rotation restriction nail 53 (a slit is formed around it). The rotation restriction nail 45 is locked on a prescribed portion of the rotary member 70, whereby rotation of the rotary member 70 is restricted.

A pair of extensions 52 are formed on the outer circumferential surface of the bottom portion 51 at opposite circumferential positions, and a pair of support pieces 61 are erected parallel with each other from the respective extensions 52. The pair of support pieces 61 are disposed inside the pair of support walls 81 which constitute the holding portion 80 (see FIG. 6). In the embodiment, the distance between the outer surfaces of the pair of support pieces 61 is set so as to be suitable for the distance between the inner surfaces of the pair of support walls 81 (see FIG. 6).

Furthermore, the pair of support pieces 61 are formed so as to be located outside the pair of rods 20 when they are coupled with the rotary member 70 (see FIGS. 2 and 7) and to guide the pair of rods 20 when they slide as the rotary member 70 rotates.

Each support piece 61 is formed with, as outside portions, two side walls 62 which extend along the edges, located at the two ends in the width direction, of the support piece 61 and a ceiling wall 63 which is connected to the top ends (i.e., the ends distant from the bottom surface 51a) of the side walls 62. As such, the side walls 62 and the ceiling portion 63 form an approximately U-shaped frame that is open at the bottom (on the side of the bottom surface 51a) and at the side. The distance between the pair of side walls 62 is set so as to be suitable for the width of the support wall 81 of the holding portion 80 (see FIG. 5).

A tip portion of the support wall 81 of the holding portion 80 is inserted between the pair of side walls 62 and positional deviation of the support piece 61 in directions parallel with the installation surface 7 is thereby prevented, and the tip of the support wall 81 is locked on the ceiling wall 63 and the support piece 61 is thus supported (see FIGS. 5 and 6).

Furthermore, each support piece 61 is formed with the bendable, elastic engagement piece 65 (an approximately U-shaped slit 61a is formed around it). A base portion of the elastic engagement piece 65 is connected to the above-mentioned extension 52 and its free end is located, adjacent to the ceiling wall 63. An engagement projection 66 projects from the outside surface of each, elastic engagement piece 65. A restriction surface 66a (facing the ceiling wall 63) of the engagement projection 66 is engaged with a restriction surface 85a (i.e., the inner surface located at the top of the hole 85 in the erection direction, of the support wall 81) of the hole 85 of the support wall 81 of the holding portion 80, whereby the base portion 50 is prevented from coming off the installation surface 7 is the direction perpendicular it (see FIG. 6).

Figure 7:
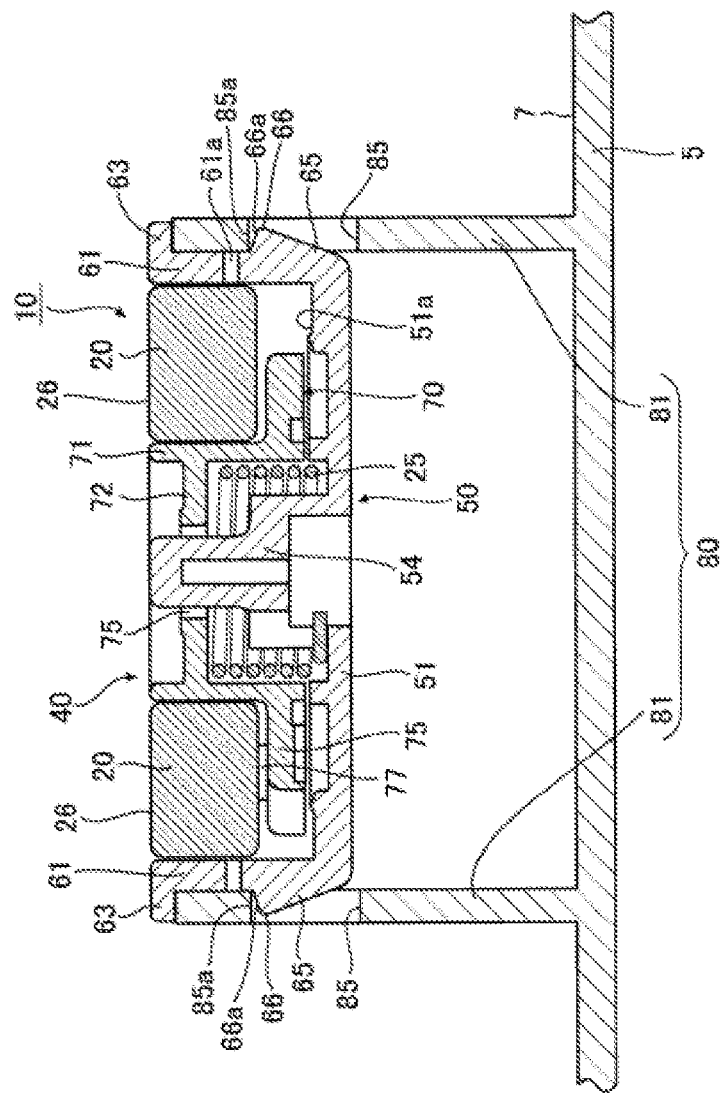
FIG. 7 is a sectional view taken along arrowed line A-A in FIG. 2.
Figure 8:
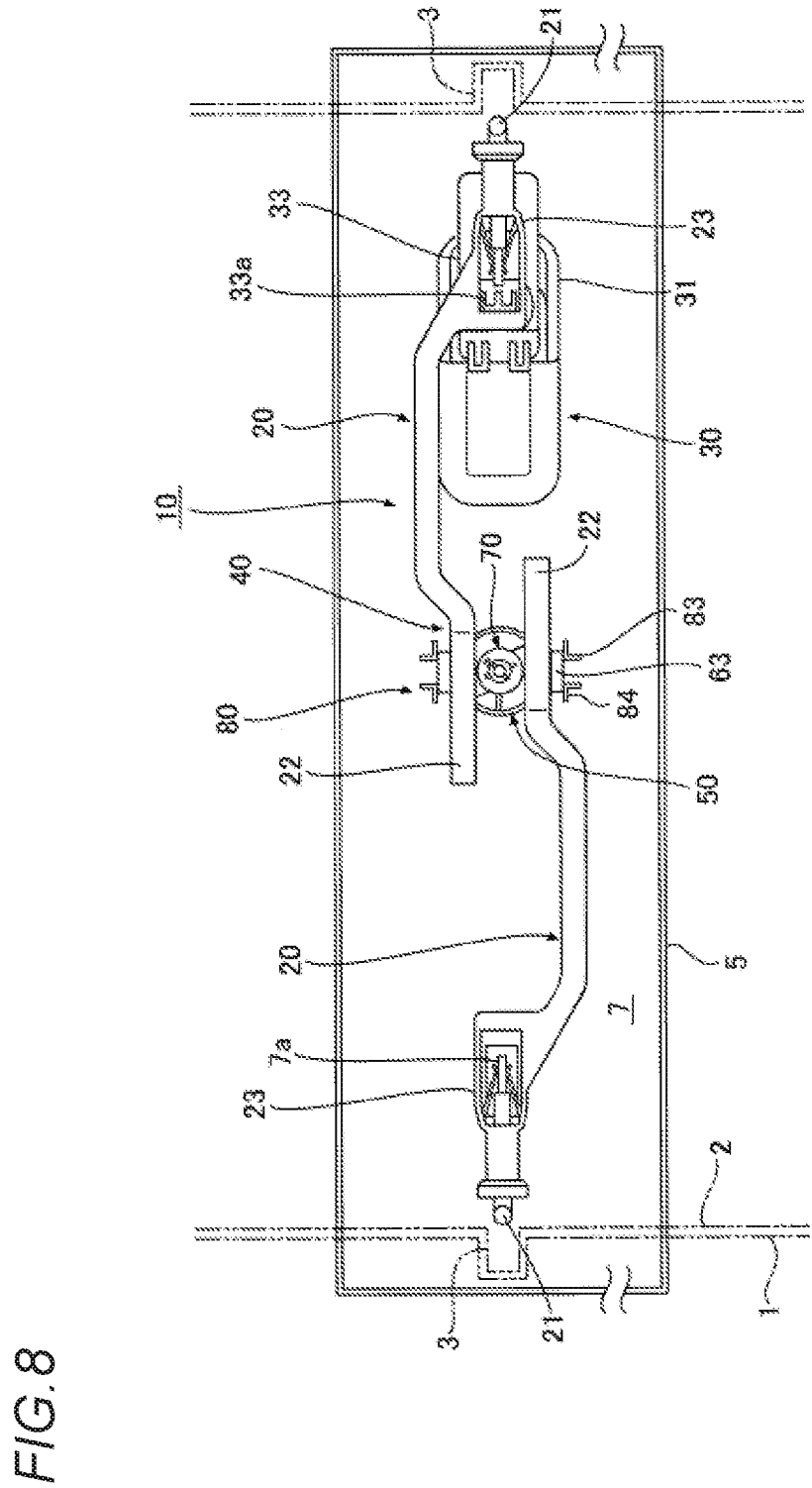
FIG. 8 is an explanatory diagram showing a state of the same lock device that an opening/closing body is closed.

That is, in the embodiment, the engagement projections 66 of the elastic engagement pieces 65, the holes 85 of the support walls 81 of the holding portion 80 constitute "coming-off-preventive portions" for preventing the base portion from coming off the installation surface in the direction perpendicular to it. As shown in FIG. 7, "restriction surfaces" of the coming-off-preventive portions, that is, the restriction surfaces 66a of the engagement projections 66 of the elastic engagement pieces 65 and the restriction surfaces 85a of the holes 85 of the support walls 81, are located above or at the same level as the bottom surface 51a of the base portion 50 and below or at the same level as the ceiling surfaces 26 of the rods 20.

The degrees of bending of the elastic engagement pieces 65 are restricted by the rods 20 which, are disposed between the pair of support pieces 61. In this example, as shown in FIG. 7, when the pair of rods 20 are coupled wife the rotary member 70 and disposed between the pair of support pieces 61, the pair of elastic engagement pieces 65 come into contact with, or close to the outer surfaces of the pair of rods 20, whereby bending of the elastic engagement pieces 65 is restricted by the rods 20.

The shape of the above elastic engagement pieces is not limited to the above-described one; it suffices that each elastic engagement piece be able to engage with the associated holding portion. Each elastic engagement piece may be in such a form, as to engage wife a recess instead of the hole. Furthermore, although in the embodiment the elastic engagement pieces are provided on the base portion, they may be formed on a holding portion that is provided on the installation surface of the opening/closing body or the fixed body. In this case, the elastic engagement pieces provided on the holding portion engage with the base portion (this mode will be described in an embodiment to be described later). Furthermore, for example, the above-mentioned "coming-off-preventive portions" may be such that support pieces of the base portion are formed with respective recesses or holes and a holding portion that is formed on the opening/closing body or the fixed body is provided with elastic engagement pieces (this mode will be described in an embodiment to be described later). There axe no particular limitations on the coming-off-preventive portions as long as they can prevent the base portion from coming off the installation surface in the direction perpendicular to it.

Figure 16:
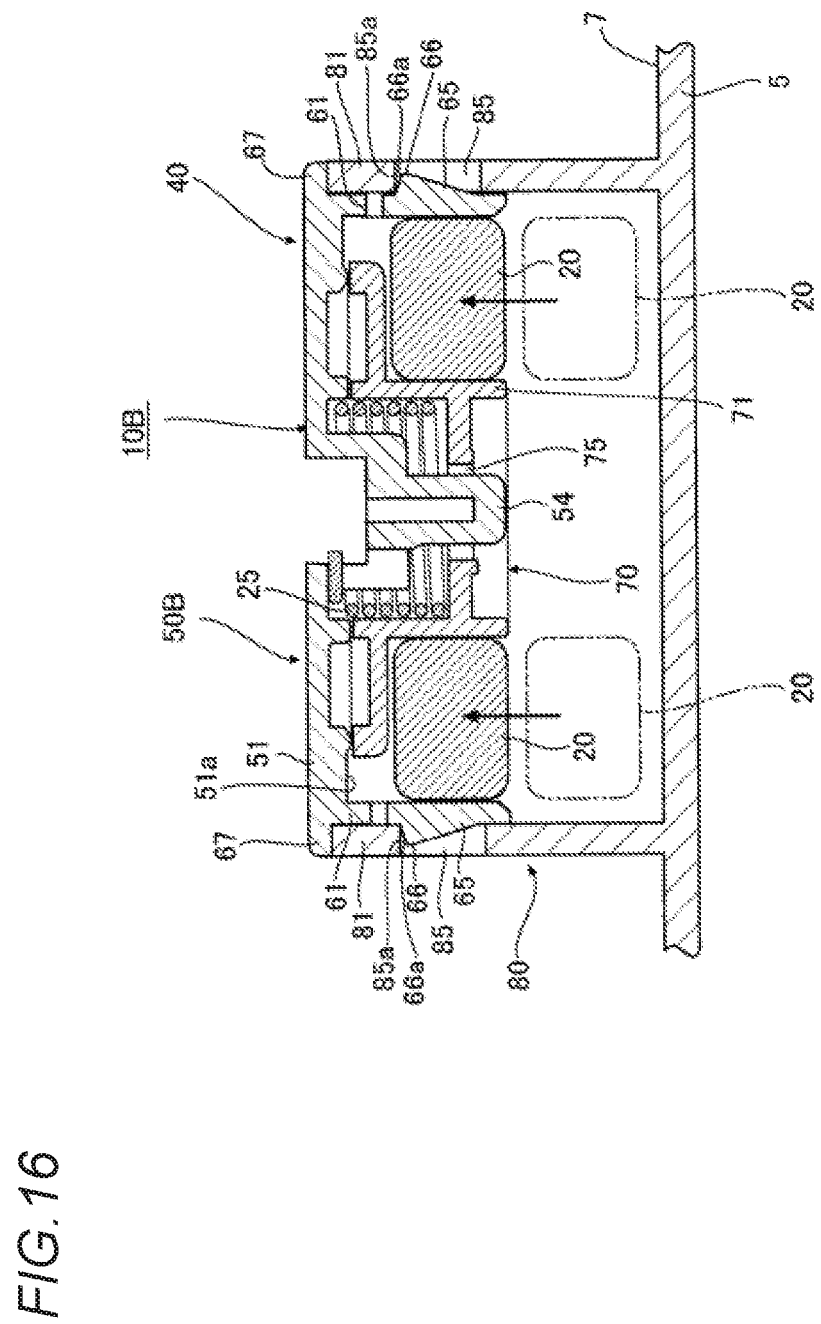
FIG. 16 is a sectional view taken along line E-E in FIG. 15.

In the embodiment, the base portion 50 is installed on the installation surface 7 by engaging the elastic engagement pieces 65 with the holding portion 80 which is provided on the installation surface 7. The sentence "the base portion is installed on the installation surface" as used in the invention includes a case that the base portion is installed on the installation surface in such a manner as to be in contact with it, the case of the embodiment that the base portion 50 is installed on the installation surface 7 in such a manner as to be not in contact with it (i.e., to be spaced from it by a prescribed gap; see FIG. 7)), and even a case that as shown in FIG. 16 the bottom surface of the base portion is located on the side opposite to the installation surface. As such, this sentence means that the base portion is installed fixedly, that is, so as not to move relative to the installation surface.

Next, the rotary member 70 will be described. As shown in FIG. 4, the rotary member 60 employed in the embodiment has a main body 71 which is approximately shaped like a cylinder having a ceiling plate 72 near its top, a pair of extension pieces 75 which extend outward from the circumferential edge of the base-side opening at circumferential positions that are opposite to each other; and two approximately spherical rod link portions 77 which project from the front surfaces of the extension pieces 75 toward the side of the ceiling plate 72 and are to be inserted into and coupled with the link recesses 22a of the rods 20, respectively.

In a state that each rod link portion 77 is inserted in and coupled with the link recess 22a of the associated rod 20, the rod 20 has no play in its longitudinal direction and has prescribed play in the direction perpendicular to its longitudinal direction.

An axial hole 73 having two grooves 73a are formed through the ceiling plate 72 at the center. The rotary member 70 is supported by the base portion 50 rotatably and attached to the base portion 50 in such a manner as to be prevented from coming off it by inserting the shaft portion 54 into the axial hole 73 with the two projections 54b of the shaft portion 54 registered with the two respective grooves 73a and then rotating the rotary member 70. That is, the axial hole 73 and the shaft portion 54 constitute a "support portion" of the invention. There are no particular limitations on the support portion as long as the rotary member can be supported by the base portion rotatably; for example, the rotary member and the base portion may be formed with a shaft portion and an axial hole, respectively.

In a state that as described above the rotary member 70 is attached to the base portion 50 so as to be prevented from coming off it, the circumferential wall of the main body 71 is opposed to the above-described pair of support pieces 61 with gaps capable of receiving the respective rods 20 formed in between (see FIG. 6) and hence the rods 20 can be inserted into the respective gaps iron; the direction perpendicular to the bottom surface 51a of the base portion 50.

The ceiling plate 72 is formed with, adjacent to the outer circumference of the axial bole 73, a spring lock piece 74 on which the other end of the urging spring 25 is locked.

Furthermore, the rotary member 70 is urged by the urging spring 25 so as to rotate in the direction indicated by arrows F in FIG. 2, whereby the pair of rods 20 which are coupled with the rotary member 70 are urged in such directions as to engage with the pair of lock portions 3, respectively, the pair of rods 20 which are coupled with the rotary member 70 can slide in synchronism with each other; when one rod 20 slides, the other rod 20 also slides in linkage with the former action.

There are no particular limitations on the rotary member that allows the pair of rods to slide. An example other than the rotary member 70 employed in the embodiment is a structure in which a pinion gear is employed and each of the pair of rods is formed with rack grooves, the pinion gear is meshed with the rack, grooves, whereby when one rod slides, the other rod is slid via the pinion gear.

Next, workings and advantages of the lock device 10 having the above configuration will be described.

First, a procedure for attaching the link unit 40 will be described. After the one end of the urging spring 25 is locked on the spring lock groove 54a of the base portion 50 and the other end of the urging spring 25 is locked on the spring lock piece 74 of the rotary member 70, the shaft portion 54 is inserted into the axial hole 73 with the two projections 54b of the shaft portion 54 registered with the two grooves 73a of the rotary member 70 against rotational urging force of the urging spring 25. As a result, the rotary member 70 is urged rotationally by the urging spring 25 and the projections 54b of the shaft portion 54 are located outside the axial hole 73 on its front side, whereby the rotary member 70 is attached to the base portion 50 rotatably in such a manner as to be prevented from coming off it. Thus, the link unit 40 shown in FIG. 5 is completed.

Subsequently, as shown in FIG. 5, the pair of support pieces 61 of the base portion 50 are set inside the pair of support walls 81 of the holding portion 80 so as to be registered with them and, in this state, the link unit 40 is brought closer to the installation surface 7 of the opening/closing body 5. As a result, tip portions of the support walls 81 are inserted between the pair of outside side walls 62 of the support pieces 61 and the elastic engagement pieces 65 are bent because their outer surfaces are pushed by the respective support walls 81. When their engagement projections 66 reach the holes 85 of the support walk 81, respectively, the elastic engagement pieces 65 recover elastically, whereby the restriction surfaces 66a of the engagement projections 66 engage with the restriction surfaces 85a of the holes 85, respectively; that is, the elastic engagement pieces 65 engage with the holding portion 80, and the tip portions of the support walls 81 is locked on the ceiling wall 63 of the support pieces 61, respectively (see FIG. 6).

In this state in which the support walls 81 are installed between the pair of side walls 62 of the support pieces 61, positional deviation of the link unit 40 in directions parallel with the installation surface 7 is prevented. Furthermore, since the engagement projections 66 of the elastic engagement pieces 65 are engaged with the holes 85 of the support walls 81, the link unit 40 can be prevented from coming off the installation surface 7 in the direction perpendicular to it.

In the state that as described above the link unit 40 is installed on the installation surface 7, the pair of rods 20 are pushed into the gaps between the circumferential wall of the main body 71 and the pair of support pieces 61 toward the bottom, surface 51a of the base portion 50 in the direction perpendicular to the bottom surface 51a, whereby the rod link portions 77 of the rotary member 70 are coupled with the link recesses 22a of the rods 20, respectively. The pair of the rods 20 are thus coupled with the rotary member 70.

According to the lock device 10, the link unit 40 which is separate from the manipulation unit 30 can be attached to the installation surface 7 of the opening/closing body 5 by easy work of merely putting the link unit 40 on the installation surface 7 and engaging the elastic engagement pieces 65 of the base portion 50 with the holding portion 80 which is provided on the installation surface 7. This work of attaching the link unit 40 is easier than, for example, attachment work using small screws. Furthermore, since the link unit 40 is provided separately from the manipulation unit 30, the degree of freedom of layout can be increased and the installation space of the lock device 10 can be made thinner.

In the embodiment, as shown in FIG. 6, the pair of support pieces 61 of the base portion 50 are disposed inside the pair of support walls SI of the holding portion 80 and they constitute the above-mentioned coming-off-preventive portions. Thus, the base portion 50 can be prevented from coming off while play between the pair of support walls 81 and the pair of support pieces 61.

Furthermore, in the embodiment, as shown in FIG. 6, the coming-off-preventive portions (in this example, the engagement projections 66 of the elastic engagement pieces 65 and the holes 85 of the support walls 81) having the restriction surface (in this example, the restriction-surface 66a of the engagement projection 66 and the restriction surface 85a of the boles 85) are provided at the positions that are located above or at the same level as the bottom surface 51a of the base portion 50 and below or at the same level as the ceiling surfaces 26 of the rods 20. Thus, the coming-off-preventive portions overlap wife the installation spaces of the rods 20 in the thickness direction of the link unit 40, whereby the link unit 40 can be made thinner and more compact.

In the embodiment, the pair of support pieces 61 of the base portion 50 are disposed outside the pair of rods 20, respectively (see FIG. 7), and guide them when they slide as the rotary member 70 rotates. Thus, a slide guide structure for the pair of rods 20 can be provided easily while the base portion 50 is prevented from coming off utilizing the pair of support pieces 61.

Furthermore, in the embodiment, the elastic engagement pieces 65 are formed in the respective support, pieces 61 and are provided so that they engage wife the respective recesses or holes (in this example, the holes 85) and that their bending is restricted by the rods 20 being placed between the pair of support pieces 61. Thus, when as shown in FIG. 7 the rods 20 are coupled with the rotary member 70 in a state that the base portion 50 is prevented from, coming off the installation surface 7, bending of the elastic engagement pieces 65 can be restricted. And the engagement of the elastic engagement pieces 65 with the holding portion 80 is made stronger, whereby the strength of attachment of the link unit 40 to the installation surface 7 can be increased.

In the lock device 10, the opening/closing body 5 is locked in a closed state when the opening portion 2 of the fixed body 1 is closed by the opening/closing body 5 and the tip portions 21 of the pair of rods 20 are engaged with the pair of lock portions 3 of the fixed body 1, respectively (see FIG. 2). When in this state one rod 20 is pulled inward in the opening/closing body 5 via the manipulation piece 33a by manipulating the manipulation knob 33 of the manipulation unit 30, the other rod 20 is also pulled inward in the opening/closing body 5 via the rotary member 70. As a result, the engagement between the tip portions 21 of the pair of rods 20 and the pair of lock portions 3 is canceled to make it possible to open the opening/closing body 5 from the opening portion 5 of the fixed body 1 (see FIG. 8).

FIGS. 9-14 show an opening/closing body lock device according to a second embodiment of the invention. Portions, members, etc. having substantially the same ones in the above embodiment will be given the same symbols as the latter and descriptions therefor will be omitted.

Figure 9:
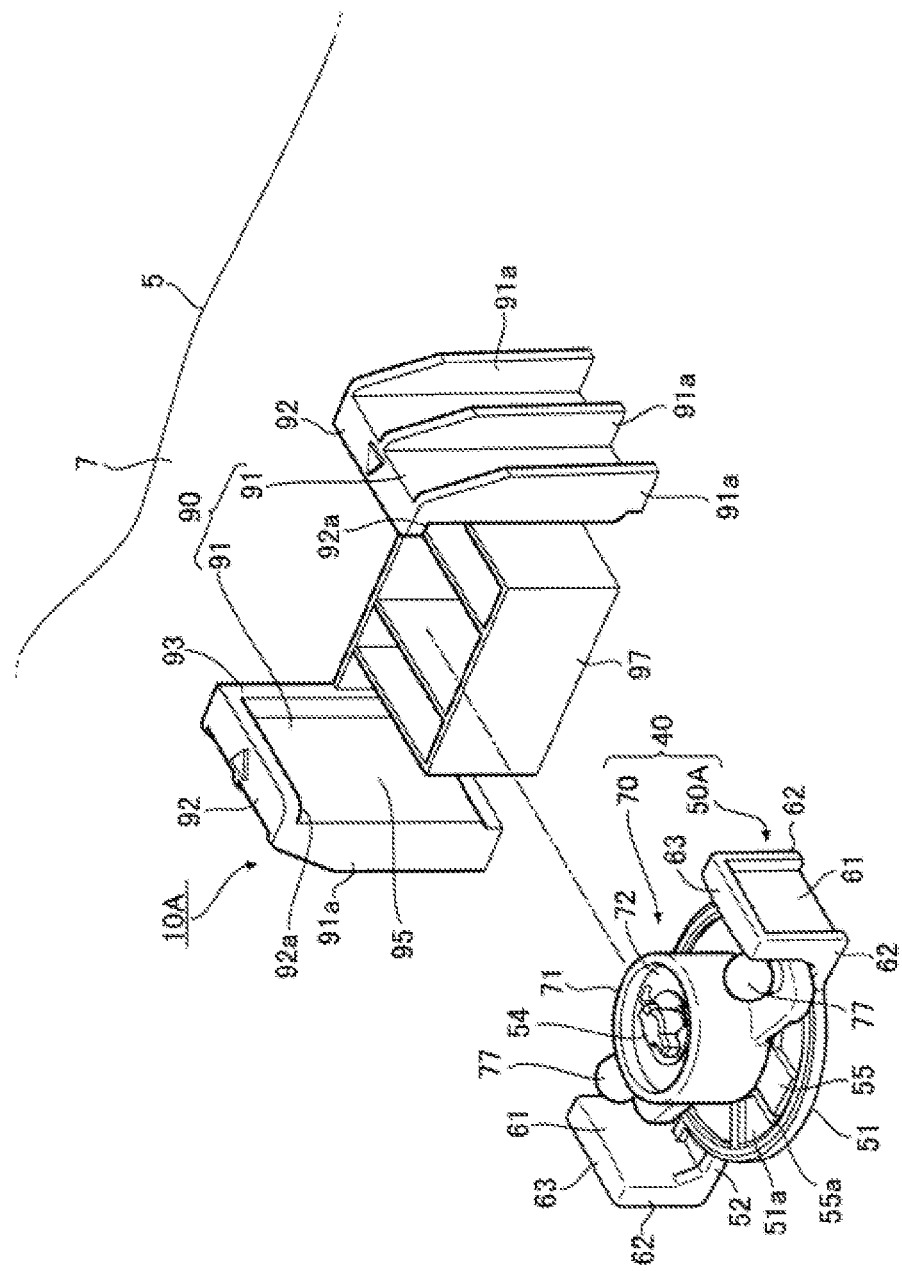
FIG. 9 is an enlarged exploded perspective view of an essential part of an opening/closing body lock device according to a second embodiment of the invention.
Figure 10:
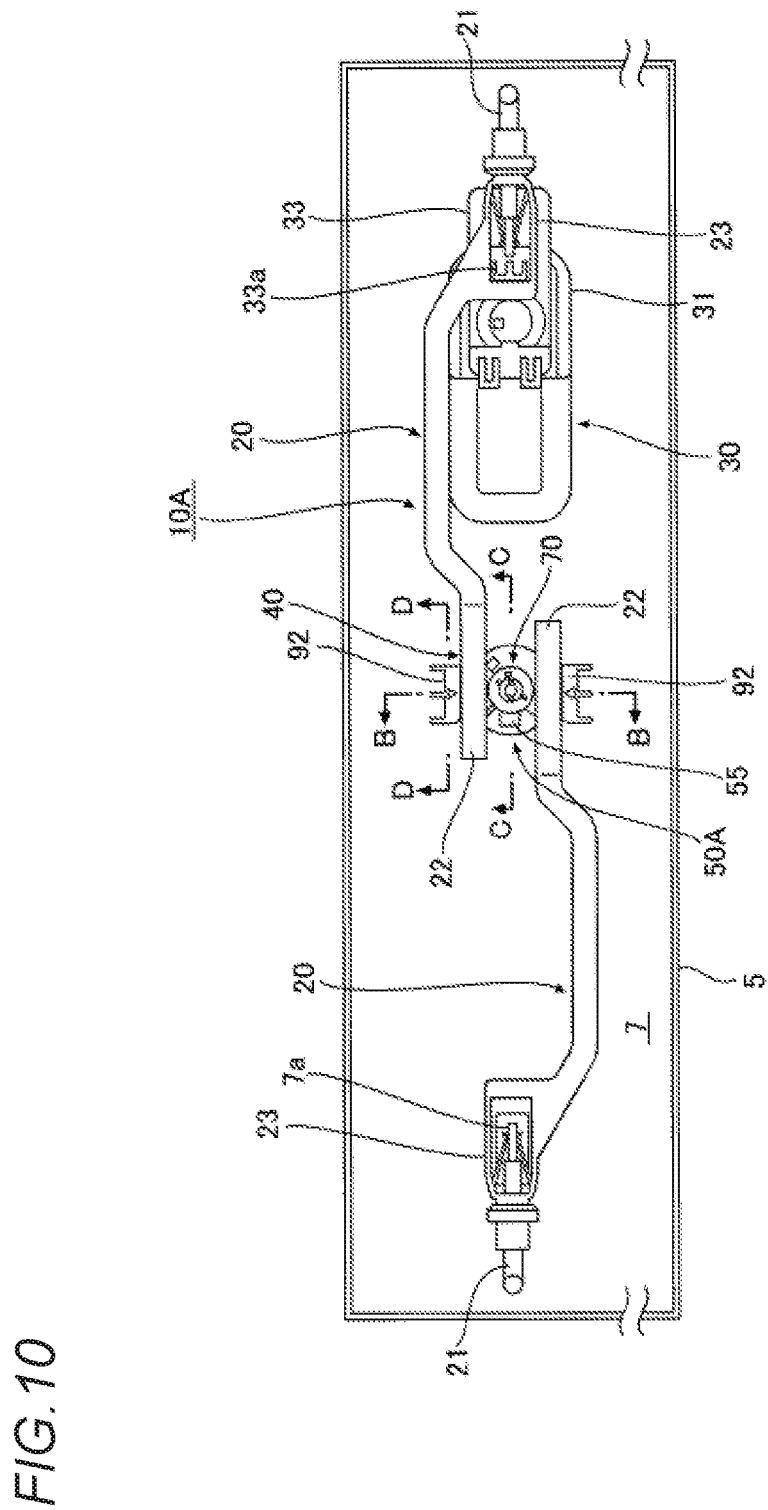
FIG. 10 is an explanatory diagram of the same lock device.

As shown in FIG. 9, the opening/closing body lock device 10A (hereinafter referred to as a "lock device 10A") according to this embodiment is different from the opening/closing body lock device according to the above embodiment in the structure of the holding portion.

More specifically, as shown in FIG. 9, a holding portion 90 employed in this embodiment has receiving portions 95 for receiving the base portion 50 coming from a direction that crosses the direction perpendicular to the installation surface 7.

Even more specifically, the holding portion 90 has a pair of support walls 91 which are erected from the installation surface 7 of the opening/closing body 5 so as to be opposed to each other. The pair of support walls 91 have, at the top ends, respective lock walls 92 which project in such directions as to come closer to each other. Furthermore, the pair of support walls 91 are formed with respective side walls 93 on one side, that is, on the destination side in the direction in which to receive the link unit 40. A recess is formed inside each of the pair of support walls 91 by the side wall 93 and the lock wall 92. The distance between the inner surfaces of the pair of support walls 91 is set so as to be suitable for the distance between the pairs of end surfaces of the outward projecting side walls 62 of the pair of support pieces 61 of the link unit 40 (see FIG. 12). The outside surface of each support wall 91 is formed with plural reinforcement walls 91*a* (see FIG. 12).

A lock box 97 which has plural circumferential walls and is open at the top and whose internal space is partitioned by plural partition walls is provided between the coming-off-preventive walls 70. The distance between the top surface of the lock box 97 and the lock walls 92 of the respective support walls 91 is set so as to be suitable for the height of the support pieces 61 of the link unit 40 (i.e., the distance between the back surface of the bottom portion 51 and the top surfaces of the lock walls 92). The space that is surrounded by the pair of support walls 91, the lock walls 92, the side walls 93, the inside recesses formed by them, and the lock box 75 is a receiving portion 95 which receives the base portion 50 (see FIGS. 9 and 12).

Figure 11:
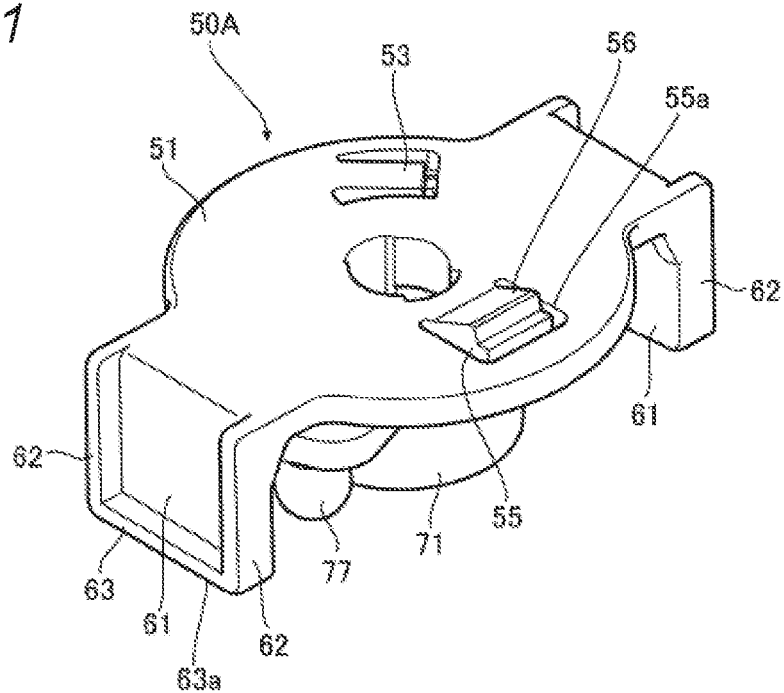
FIG. 11 is a perspective view showing a base portion of a link unit of the same lock device.

On the other hand, the structure of the base portion 50A of the link unit 40 employed in this embodiment is different from the base portion 50 of the link unit 40 employed in the above-described embodiment. More specifically, as shown in FIG. 11, the pair of support pieces 61 are not formed with the respective elastic engagement pieces 65 and the base portion 50A is formed with, on the side of the bottom surface 51*a* (in this example, at a prescribed circumferential position of the bottom portion 51), a bendable elastic engagement piece 55 (a slit 55*a* is formed around it) having an engagement projection 56 on its outer surface. In this embodiment, the bottom portion 51, in which the elastic engagement piece 55 is formed, of the base portion 50A is au "engagement portion" of the invention.

Figure 14:
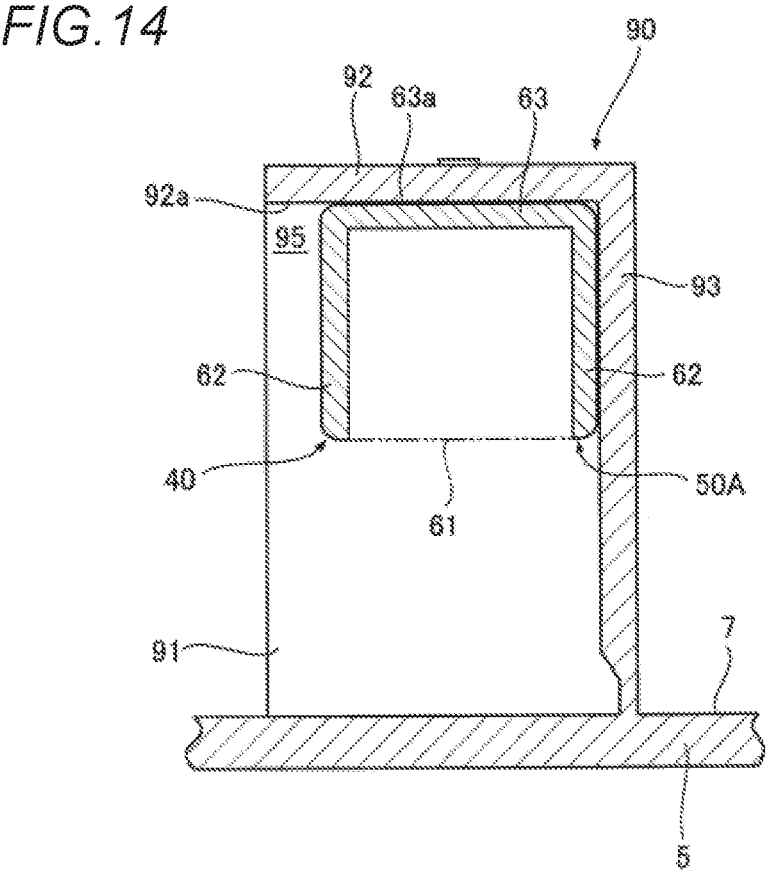
FIG. 14 is a sectional view takes along line D-D in FIG. 10.

When as shown in FIG. 9 the base portion 50A of the link unit 40 is inserted from the side of the opening of the receiving portion 95 of the holding portion 90, the base portion 50A is put on the lock box 97 and its pair of support pieces 61 are placed inside the pair of support walls 91 of the holding portion 90 (see FIG. 12) and the associated side walls 62 of the support pieces 61 come into contact with the side walls 93 of the support walls 91, respectively, whereby the insertion of the base portion 50A is restricted (see FIG. 14).

Figure 12:
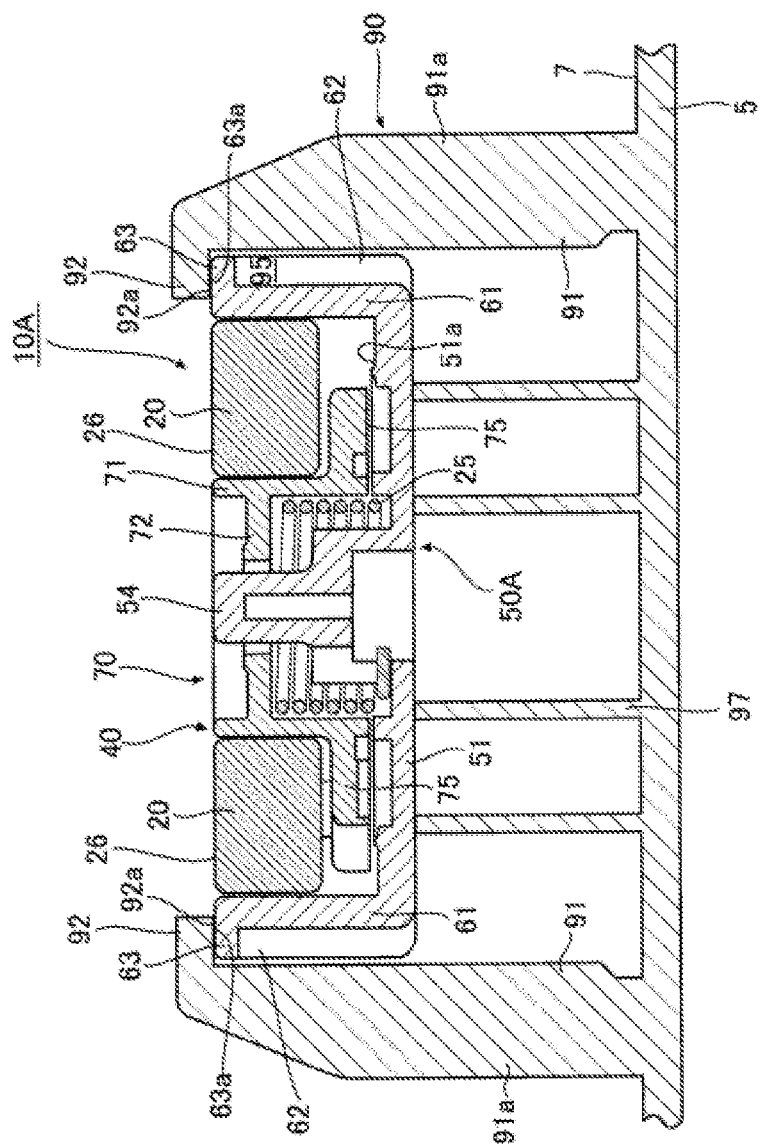
FIG. 12 is a sectional view taken along line B-B in FIG. 10.

Furthermore, restriction surfaces 63*a* (surfaces spaced from the bottom surface 51*a*) of the ceiling walls 63 of the pair of support pieces 61 of the base portion 50A are locked on restriction surfaces 92*a* (surfaces facing the installation surface 7) of the lock walls 92 of the pair of support walls 91 of the holding portion 90, respectively, whereby the base portion 50A is prevented from coming off the installation surface 7 in the direction perpendicular to it (see FIG. 12). That is, in this embodiment, the ceiling walls 63 of the support pieces 61 of the base portion 50A and the lock walls 92 of the support walls 91 of the holding portion 90 constitute the "coming-off-preventive portions" of the invention. In the embodiment, as shown in FIG. 12, "restriction surfaces" of the coming-off-preventive portions, that is, the restriction surfaces 63*a* of the ceiling walls 63 of the support pieces 61 and the restriction surfaces 92*a* of the lock walls 92 of the support walls 91 are located at positions that coincide with the positions of the ceiling surfaces 26 of the rods 20.

Figure 13:
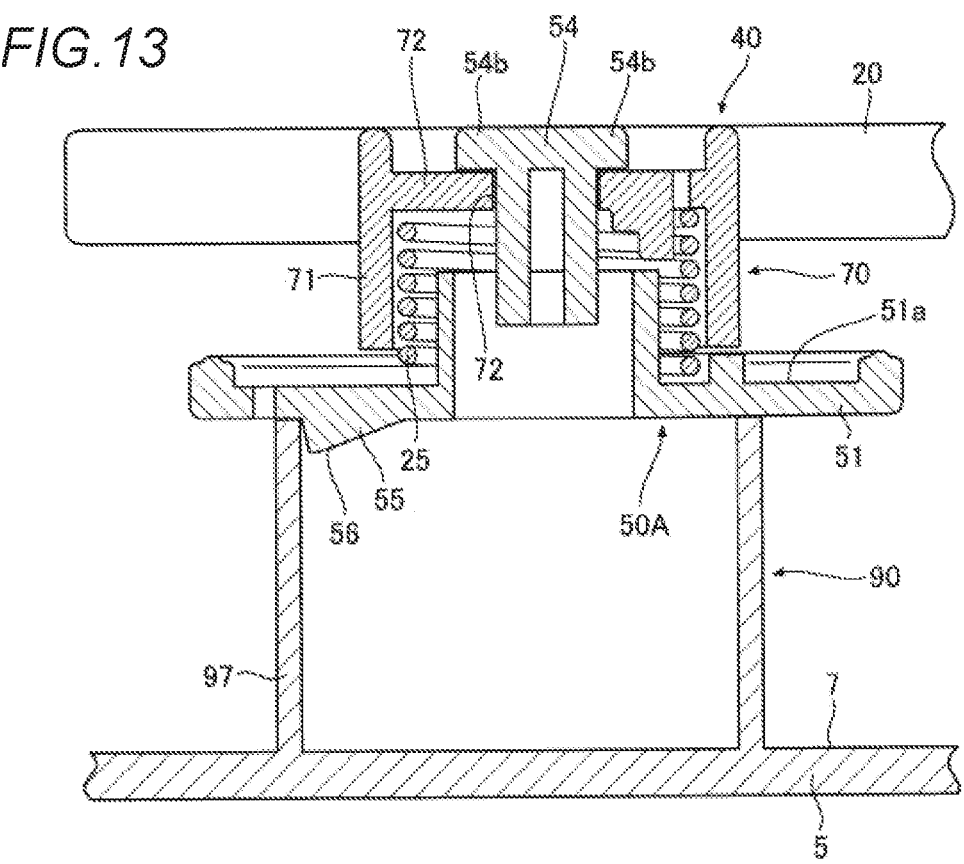
FIG. 13 is a sectional view taken along line C-C in FIG. 10.

Furthermore, the engagement projection 56 of the elastic engagement piece 55 of the base portion 50A is engaged with the inside an edge of the lock box 97, whereby the base portion 50A is prevented, from corning off through the opening of the receiving portion 95 (see FIG. 13).

In this embodiment, the base portion 50A is formed with the elastic engagement piece 55 on its bottom surface side. When the base portion 50A is inserted into the receiving portion 95 of the holding portion 90, the elastic engagement piece 55 is engaged with the inside portion of the receiving portion 95 of the holding portion 90, whereby the base portion 50A is prevented from coming off the receiving portion 95. Thus, a force for preventing the base portion 50A from coming off the installation surface 7 in the direction perpendicular to it is held by the receiving portion 95 and does not act on the elastic engagement piece 55, as a result of which the base portion 50A can be prevented from coming off the installation surface 7 reliably.

FIGS. 15 and 16 show an opening/closing body lock device according to a third embodiment of the invention. Portions, members, etc. having substantially the same ones in the above embodiments will be given the same symbols as the latter and descriptions therefor will be omitted.

As shown in FIGS. 15 and 16, the opening/closing body lock device 10B (hereinafter referred to as a "lock device 10B") according to this embodiment is different from the opening/closing body lock devices according to the above embodiments in the installation direction of a base portion 50B of a link unit 40 with respect to the installation surface 7.

More specifically, in this embodiment, flange portions 67 project from the outer surfaces of base portions of the pair of support pieces 61 of the base portion 50B of the link unit 40, respectively. Tip portions of the pair of support pieces 61 of the base portion 50B are directed to the installation surface 7 and inserted between the pair of support walls 81, whereby the tip portions of the pair of support walls 81 are locked on the flange portions 67 of the base portion 50B, respectively. Furthermore, the restriction surfaces 66*a* of the engagement projections 66 of a pair of elastic engagement pieces 65 are engaged with the restriction surfaces 85*a* of the holes 85 of the pair of support walls 81, respectively, whereby the base portion 50B can be attached to the installation surface 7 while being pre vented from coming off the installation surface 7 in the direction perpendicular to it. Subsequently, the rods 20 are inserted into the gap between the base portion 50B and the installation surface 7 and pushed into the base portion 50B, whereby the rods 20 can be coupled with the rotary member 70 (refer to arrows drawn in FIG. 16).

As described above, in this embodiment, the bottom surface 51*a* of the base portion 50B are located on the side opposite to the installation surface 7. In this embodiment, the rotary member 70 and the pair of rods 20 are interposed between the installation surface 7 and the base portion 50B and hence can be prevented from coming off effectively.

Figure 17:
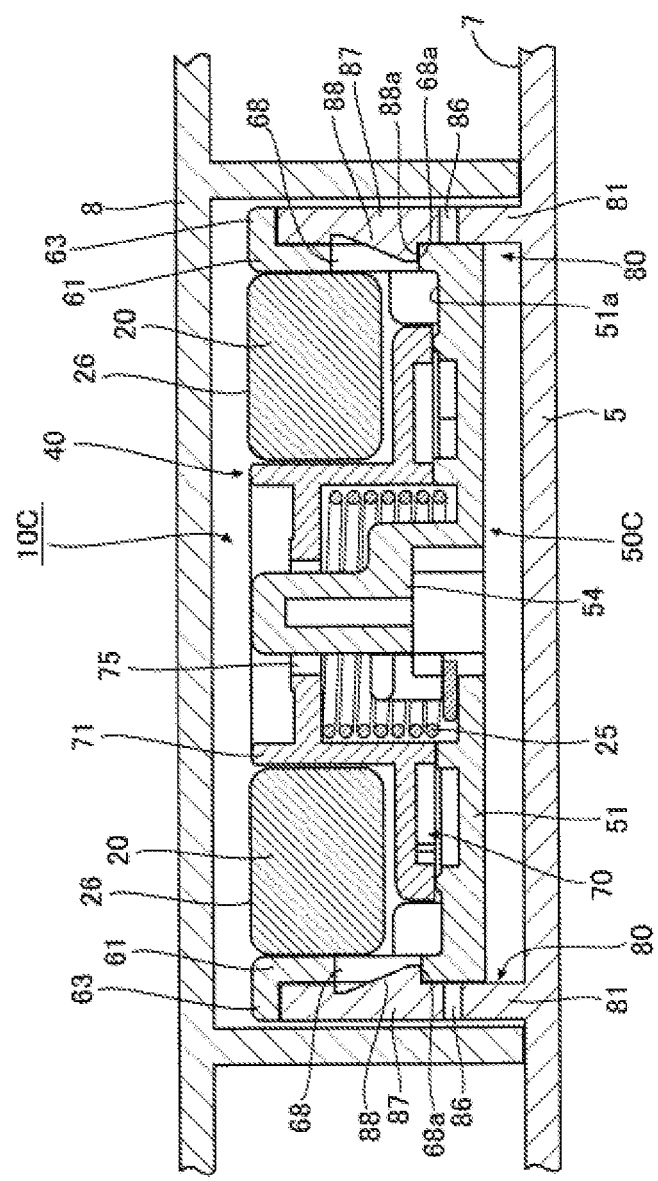
FIG. 17 is an enlarged sectional view of an essential part of an opening/closing body lock device according to a fourth embodiment of the invention.

FIG. 17 shows an opening/closing body lock device according to a fourth embodiment of the invention. Portions, members, etc. having substantially the same ones in the above embodiments will be given the same symbols as the latter and descriptions therefor will be omitted.

As shown in FIG. 17, in the opening/closing body lock device 10C (hereinafter referred to as a "lock device 10C") according to this embodiment, a pair of support walls 81 of a holding portion 80 which is provided on the installation surface 7 of the opening/closing body 5 (or fixed body 1) are formed with bendable elastic engagement pieces 87 (slits 86 are formed around them), respectively. An engagement projection 88 having a flat restriction surface 88*a* on the side of the installation surface 7 projects from the inner surface of each elastic engagement piece 87. On the other hand, a pair of support pieces 61 of a base portion 50C are formed with holes 68 with which the engagement projections 88 of the elastic engagement pieces 87 are to engage.

The bottom portion 51 of the base portion 50C is pushed toward the installation surface 7 and the pair of support pieces 61 of the base portion 50C are inserted between the pair of support walls 81 of the holding portion 80, whereby the restriction surfaces 88a of the engagement projections 88 of the pair of elastic engagement pieces 87 are engaged with restriction surfaces 68a of the holes 68 of the pair of support pieces 61, respectively. As a result, the base portion 50C can be attached to the installation surface 7 while being prevented from coming off the installation surface 7 in the direction perpendicular to it. In this embodiment, a cover 8 is provided which covers the pair of support walls 81 of the holding portion 80 and the link unit 40.

Figure 18:
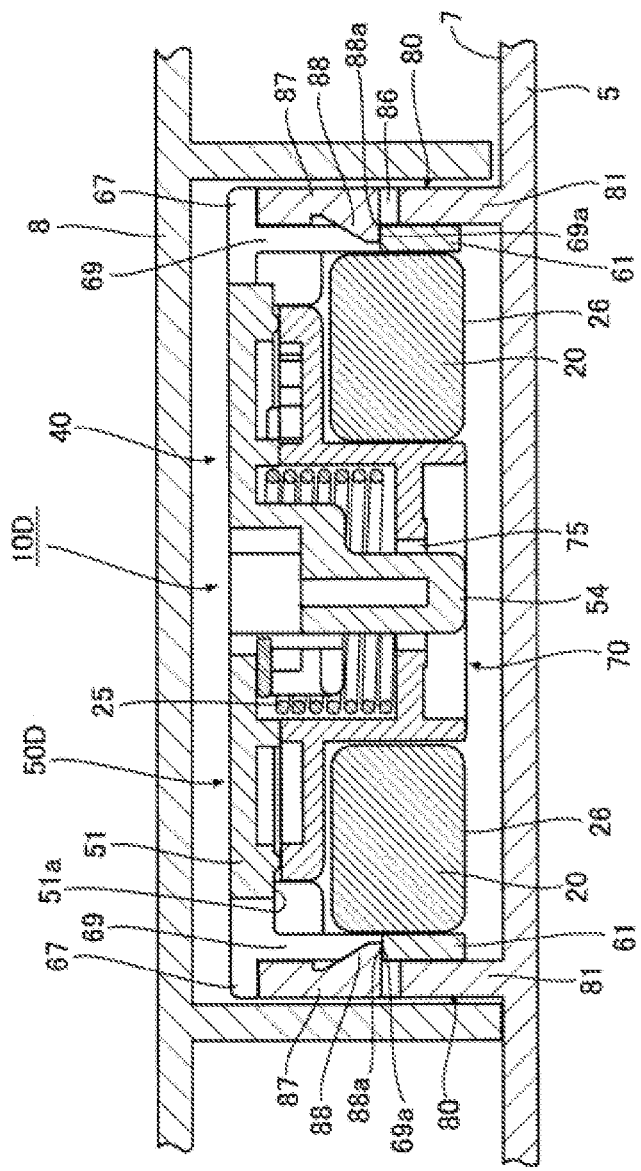
FIG. 18 is an enlarged sectional view of an essential part of an opening/closing body lock device according to a fifth embodiment of the invention.

FIG. 18 shows as opening/closing body sock device according to a fifth embodiment of the invention. Portions, members, etc. having substantially the same ones in the above embodiments will be given the same symbols as the latter and descriptions therefor will be omitted.

As shown in FIG. 18, the opening/closing body lock device 10D (hereinafter referred to as a "lock device 10D") according to this embodiment is different from the opening/closing body lock device according to the fourth embodiment in the installation direction of a base portion 50D of a link unit 40 with respect to the installation surface 7. Whereas the base portion 50D is similar in structure as the base portion 50B employed in the third embodiment, a pair of support pieces 61 are formed with grooves 69 into which the engagement projections 88 of the elastic engagement pieces 8 of the holding portion 80 are to be inserted. The tip-side inner surfaces (the surfaces distant from the bottom surface 51a) of the grooves 69 are restriction surfaces 69a of the coming-off-preventive portions, respectively.

Tip portions of the pair of support pieces 61 of the base portion 50D are directed to the installation surface 7 and inserted between the pair of support walls 81, whereby the tip portions of the pair of support walls 81 are locked on the flange portions 67 of the base portion 50D, respectively. Furthermore, the restriction surfaces 88a of the engagement projections 88 of the pair of elastic engagement pieces 87 are engaged with restriction surfaces 69a of the grooves 69 of the pair of support pieces 61, respectively; whereby the base portion 50D can be attached to the installation surface 7 while being prevented from coming off the installation surface 7 in the direction perpendicular to it.

The invention is not limited to the above embodiments. Various modifications are possible without departing from the spirit and scope of the invention, and such modifications are also included in the scope of the invention.

BRIEF DESCRIPTION OF REFERENCE NUMERALS

1: Fixed Body
2: Opening Portion
3: Lock Portion
5: Opening/Closing Body
7: Installation Surface
10, 10A, 10B, 10C, 10D: Opening/Closing Body Lock Device (Lock Device)
20: Rod
26: Ceiling Surface
25: Urging Spring
30: Manipulation Unit
40: link Unit
50, 50A, 50B, 50C, 50D: Base Portion
51: Bottom Portion
51a: Bottom Surface
55: Elastic Engagement Piece
61: Support Piece
65; Elastic Engagement Piece
70: Rotary Member
80: Holding Portion
81: Support Wall
85: Hole
87: Elastic Engagement Piece
90: Holding Portion
91: Support Wall
95: Receiving Portion

The invention claimed is:

1. A lock device for an opening/closing body that is attached to an opening portion of a fixed body so as to be openable and closable, the lock device comprising:
lock portions provided on one of the opening portion of the fixed body and the opening/closing body;
a pair of rods which are provided on an other of the fixed body and the opening/closing body and are to engage with or disengage from respective lock portions;
a manipulation unit to manipulate the rods to engage or disengage the rods with or from the respective lock portions; and
a link unit which is separate from the manipulation unit and includes a base portion and a rotary member that is supported rotatably by the base portion via a support portion and is coupled with the pair of rods,
wherein the opening/closing body or the fixed body includes an installation surface on which the link unit is installed, and the installation surface is provided with a holding portion which holds the link unit,
wherein one of the base portion and the holding portion is formed with a bendable elastic engagement piece or pieces, and the base portion is installed on the installation surface as a result of the bendable elastic engagement piece or pieces being engaged with an other of the base portion and the holding portion,
wherein the holding portion of the opening/closing body or the fixed body includes a pair of support walls,
wherein the base portion includes a pair of support pieces which are disposed inside the pair of support walls,
wherein the pair of support walls and the pair of support pieces are provided with coming-off-preventive portions which prevent the base portion from coming off the installation surface in a direction perpendicular to the installation surface, and
wherein the pair of rods come into contact with or are adjacent to inner surfaces of the pair of support pieces to be disposed in an inner side of the pair of support pieces.

2. The lock device for the opening/closing body according to claim 1, wherein the base portion includes a bottom surface and a shaft portion for rotatably supporting the rotary member projects from the bottom surface,
wherein the bottom surface of the base portion is-configured to be opposed to bottom surfaces of the rods in an axial direction of the shaft portion in a state that the rotary member is rotatably supported by the shaft portion and the pair of rods are coupled with the rotary member, and
wherein coming-off-preventive portions, having respective restriction surfaces that prevent the base portion from coming off the installation surface in the direction perpendicular to the installation surface, are located at a position that is above or at a same level as the bottom surface of the base portion and below or at a same level as ceiling surfaces of respective rods.

3. The lock device for the opening/closing body according to claim 1, wherein the pair of support pieces of the base portion are formed so as to guide the pair of rods when the pair of rods slide as the rotary member rotates.

4. The lock device for the opening/closing body according to claim 1, wherein the support walls are formed with respective recesses or holes, and
wherein the bendable elastic engagement pieces are formed in respective support pieces, engaged with the respective recesses or holes, and formed so as to be bending-restricted by the rods being disposed between the pair of support pieces.

5. The lock device for the opening/closing body according to claim 1, wherein the holding portion of the opening/closing body or the fixed body includes a receiving portion which receives the base portion from a direction that crosses the direction perpendicular to the installation surface, and
wherein the bendable elastic engagement piece is formed in the base portion on a side of a bottom surface thereof in such a manner as to engage with an inside portion of the receiving portion of the holding portion and thereby prevent the base portion from coming off the receiving portion when the base portion is inserted into the receiving portion.

6. A lock device for an opening/closing body that is attached to an opening portion of a fixed body so as to be openable and closable, the lock device comprising:
lock portions provided on one of the opening portion of the fixed body and the opening/closing body;
a pair of rods which are provided on an other of the fixed body and the opening/closing body and are to engage with or disengage from respective lock portions;
a manipulation unit to manipulate the rods to engage or disengage the rods with or from the respective lock portions; and
a link unit which is separate from the manipulation unit and includes a base portion and a rotary member that is supported rotatably by the base portion via a support portion and is coupled with the pair of rods,
wherein the opening/closing body or the fixed body includes an installation surface on which the link unit is installed, and the installation surface is provided with a holding portion which holds the link unit,
wherein one of the base portion and the holding portion is formed with a bendable elastic engagement piece or pieces, and the base portion is installed on the installation surface as a result of the bendable elastic piece or pieces being engaged with an other of the base portion and the holding portion,
wherein the holding portion of the opening/closing body or the fixed body includes a pair of support walls,
wherein the base portion includes a pair of support pieces which are disposed inside the pair of support walls,
wherein the pair of support walls and the pair of support pieces are provided with coming-off-preventive portions which prevent the base portion from coming off the installation surface in a direction perpendicular to the installation surface, and
wherein the pair of rods are disposed inside the pair of support pieces such that the pair of rods are configured to restrict the corning-off-preventive portions from moving in such a direction that a coming-off-prevention state of the coming-off-preventive portions is released.

7. A lock device for an opening/closing body that is attached to an opening portion of a fixed body so as to be openable and closable, the lock device comprising:
lock portions provided on one of the opening portion of the fixed body and the opening/closing body;
a pair of rods which are provided on an other of the fixed body and the opening/closing body and are to engage with or disengage from respective lock portions;
a manipulation unit to manipulate the rods to engage or disengage the rods With or from the respective lock portions; and
a link unit which is separate from the manipulation unit and includes a base portion and a rotary member that is supported rotatably by the base portion via a support portion and is coupled with the pair of rods,
wherein the opening/closing body or the fixed body includes an installation surface on which the link unit is installed, and the installation surface is provided with a holding portion which holds the link unit,
wherein one of the base portion and the holding portion is formed with a bendable elastic engagement piece or pieces, and the base portion is installed on the installation surface as a result of the bendable elastic piece or pieces being engaged with an other of the base portion and the holding portion,
wherein the holding portion of the opening/closing body or the fixed body includes a pair of support walls,
wherein the base portion includes a pair of support pieces which are disposed inside the pair of support walls,
wherein the pair of support walls and the pair of support pieces are provided with coming-off-preventive portions which prevent the base portion from coming off the installation surface in a direction perpendicular to the installation surface, and
wherein the pair of rods are disposed inside the pair of support pieces such that the pair of rods are configured to restrict the coming-off-preventive portions from moving inside the pair of support pieces.

* * * * *